(12) United States Patent
Sato

(10) Patent No.: US 11,846,594 B2
(45) Date of Patent: Dec. 19, 2023

(54) SINGLE-CRYSTAL X-RAY STRUCTURE ANALYSIS APPARATUS AND SAMPLE HOLDER

(71) Applicant: Rigaku Corporation, Tokyo (JP)

(72) Inventor: Takashi Sato, Tokyo (JP)

(73) Assignee: Rigaku Corporation, Tokyo (JP)

( * ) Notice: Subject to any disclaimer, the term of this patent is extended or adjusted under 35 U.S.C. 154(b) by 261 days.

(21) Appl. No.: 17/295,861

(22) PCT Filed: Nov. 21, 2019

(86) PCT No.: PCT/JP2019/045694
§ 371 (c)(1),
(2) Date: May 20, 2021

(87) PCT Pub. No.: WO2020/105724
PCT Pub. Date: May 28, 2020

(65) Prior Publication Data
US 2022/0128492 A1    Apr. 28, 2022

(30) Foreign Application Priority Data
Nov. 23, 2018   (JP) .................................. 2018-219810

(51) Int. Cl.
*G01N 23/20025*    (2018.01)
*G01N 23/20016*    (2018.01)
*G01N 23/207*    (2018.01)

(52) U.S. Cl.
CPC ..... *G01N 23/20025* (2013.01); *G01N 23/207* (2013.01); *G01N 23/20016* (2013.01)

(58) Field of Classification Search
None
See application file for complete search history.

(56) References Cited

U.S. PATENT DOCUMENTS 6,918,698 B2    7/2005    Nordmeyer et al.
7,274,769 B2    9/2007    Nordmeyer et al.
(Continued)

FOREIGN PATENT DOCUMENTS

JP    H06-194276 A    7/1994
JP    11-304999 A    11/1999
(Continued)

OTHER PUBLICATIONS

European Patent Office, EP Search Repert Issued in EP Application No. 19 886 783.0, Munich Germany, dated Jul. 29, 2022, 8 pages.
(Continued)

*Primary Examiner* — David P Porta
*Assistant Examiner* — Mamadou Faye
(74) *Attorney, Agent, or Firm* — ASLAN LAW, P.C.

(57) ABSTRACT

It is enabled to surely attach a sample holder to a goniometer head with good reproducibility in a relatively easy manner, the sample holder holding a porous complex crystal where a single-crystal is soaked. There is provided a single-crystal X-ray structure analysis apparatus that performs a structure analysis of a material, the apparatus comprising a goniometer having a goniometer head 514 to which a sample holder 310 is attached, the sample holder holding a porous complex crystal where a sample is soaked; an X-ray irradiation section that irradiates the X-rays to the porous complex crystal whose position is adjusted with the goniometer head 514, wherein a positioning portion for positioning the sample holder 310 to be attached is formed on a surface of the goniometer head 514, the sample holder 310 being attached onto the surface.

10 Claims, 12 Drawing Sheets

(56) References Cited

U.S. PATENT DOCUMENTS

| | | | |
|---|---|---|---|
| 10,190,952 | B2 | 1/2019 | Fujita et al. |
| 10,684,198 | B2 | 6/2020 | Fujita et al. |
| 2003/0152194 | A1 | 8/2003 | Nordmeyer et al. |
| 2005/0163280 | A1 | 7/2005 | Nordmeyer et al. |
| 2007/0228049 | A1 | 10/2007 | Nordmeyer et al. |
| 2012/0275567 | A1* | 11/2012 | Hasegawa ............ G01N 23/207 378/80 |
| 2015/0219533 | A1 | 8/2015 | Fujita et al. |
| 2018/0245239 | A1* | 8/2018 | Fujita ................. C07F 1/08 |
| 2019/0137367 | A1 | 5/2019 | Fujita et al. |

FOREIGN PATENT DOCUMENTS

| | | |
|---|---|---|
| JP | 2003-083412 A | 3/2003 |
| JP | 4792219 B2 | 10/2011 |
| JP | 2013-156218 A | 8/2013 |
| JP | 2014-130063 A | 7/2014 |
| JP | 2018-155680 A | 10/2018 |
| WO | WO 2011/115223 A1 | 9/2011 |
| WO | WO 2014/038220 A1 | 3/2014 |
| WO | WO 2015/132909 A1 | 9/2015 |

OTHER PUBLICATIONS

Manabu hoshino et.al., "The crystalline sponge method updated", IUC rJ, Mar. 1, 2016, pp. 139-151 (13 pages), XP055668955.

Yasuhide Inokuma, Makoto Fujita et al; "X-ray analysis on the nanogram to microgram scale using porous complexes"; Nature 495, 461-466; Mar. 28, 2013.

レビュー「結晶スポンジ法～ 結晶化のいらない 単結晶X線 構造解析法」、リガクジャーナル48(2)2017 Review "Crystalline Sponge Method ~ a singlecrystal X-ray structure analysis method without crystallization" Rigaku Journal 48 (2) 2017.

猪熊泰英、常識を覆す 結晶構造解析「結晶スポンジ」法.化学Yasuhide Inokuma, "Crystal sponge method overturns common sense of crystal structure analysis", Chemistry, vol. 68, No. 8, pp. 35-40, in particular, p. 39, fig.5, non-officieal translataion, Aug. 1, 2013.

猪熊泰英、「結晶スポンジ 法による極小量 化合物 のX線 結晶構造解析Inokuma, Yasuhide et al, "X-ray crystallography of extremely small amount of compounds by crystal sponge method", Farumashia , 2014, vol. 50, No. 8, pp. 756-761, column "5. Application of crystal sponge method", fig. 4, non-official translation.

Japanese Office Action issued in JP patent application No. 2020-557648, Japanese Patent Office (JPO), Japan, dated May 9, 2023, 4 pages.

Japanese Office Action issued in JP patent application No. 2020-557648, Japanese Patent Office (JPO), Japan, dated Feb. 14, 2023, 4 pages.

\* cited by examiner

SINGLE-CRYSTAL X-RAY STRUCTURE ANALYSIS APPARATUS AND SAMPLE HOLDER

CROSS-REFERENCE TO RELATED APPLICATIONS

This application claims priority to JP Patent Application No. 2018-219810 filed on Nov. 23, 2018, and this application claims priority to and is a 371 of international PCT Application No. PCT/JP2019/045694 filed on Nov. 21, 2019, the entire contents of which are hereby incorporated by reference.

TECHNICAL FIELD

The present invention relates to a single-crystal X-ray structure analysis apparatus, and specifically to the single-crystal X-ray structure analysis apparatus and a sample holder suitable for performing an analysis with the single-crystal X-ray structure analysis apparatus provided with a sample holder where a sample is soaked.

BACKGROUND ART

In research and development for new devices and materials, the materials are ordinarily synthesized and evaluated to determine the next research policy based on the foregoing. In a structure analysis of a material using X-ray diffraction for performing material development in a short period of time, a search method of a material structure centering on the material structure analysis capable of efficiently performing the structure analysis, and an X-ray structure analysis used therein are indispensable for efficiently searching the material structure that realizes the function/physical property of an object material.

However, it has been difficult for those other than X-ray specialists to perform the structure analysis based on the results obtained by the foregoing method. Therefore, an X-ray structure analysis system with which the structure analysis can be performed by anyone who is not even a specialist of X-rays has been demanded. In this regard, as is known from the following Patent Document 1, the single-crystal X-ray structure analysis has gained attention as a method capable of catching a precise and highly accurate three-dimensional structure of molecules.

On the other hand, in this single-crystal X-ray structure analysis, there has been such a large constraint that a single-crystal needs to be prepared by crystallizing a sample. However, as is also known from the following Non-Patent Documents 1 and 2, the single-crystal X-ray structure analysis becomes widely applicable for those including a liquid compound that cannot be crystallized, a sample incapable of acquiring a sufficient amount for crystallization, and so forth via development of a material called "crystalline sponge" (for example, a porous complex crystal in which countless pores each having a diameter of 0.5 to 1 nm are formed).

In the field of single-crystal X-ray structure analysis, when analyzing a single-crystal sample with a single-crystal X-ray structure analysis apparatus to determine a crystal structure of the single-crystal, the single-crystal sample as an analysis object was difficult to be prepared, and skillfulness via experience and intuition was further required for determining the crystal structure of the single-crystal from data obtained by analyzing the single-crystal sample as an analysis object thereof with the single-crystal X-ray structure analysis apparatus; and thus this was able to be only performed by a very limited number of persons.

On the other hand, with progress in technology and development of single-crystal X-ray structure analysis apparatus, even a person who is not skilled in crystal structure analysis technology would be able to analyze a single-crystal sample by the single-crystal X-ray structure analysis apparatus if the single-crystal sample could be only available, and thus in recent years, the crystal structure of the single-crystal sample has been able to be relatively easily determined.

PRIOR ART DOCUMENT

Patent Document

Patent Document 1: Japanese Patent No. 4792219

Non-Patent Document

Non-Patent Document 1: Makoto Fujita; X-ray analysis on the nanogram to microgram scale using porous complexes; Nature 495, 461-466; 28 Mar. 2013

Non-Patent Document 2: Review "Crystalline Sponge Method~a single-crystal X-ray structure analysis method without crystallization" Rigaku Journal 48 (2) 2017

SUMMARY OF THE INVENTION

Problems to be Solved by the Invention

According to a conventional technique, as described in Non-Patent Document 1, the crystal structure of a single-crystal can be relatively easily determined by forming a very small and fragile crystalline sponge in which a plurality of fine pores are formed and soaking a sample inside the fine pores of the crystalline sponge to analyze it by a single-crystal X-ray structure analysis apparatus.

In order to perform analysis using the crystalline sponge by the single-crystal X-ray structure analysis apparatus, it becomes necessary to surely attach a sample made into a single-crystal, that is soaked inside the fine pores of the crystalline sponge and is formed therein, to a part (a tip of a goniometer head pin) of a sample holder used for performing analysis by the single-crystal X-ray structure analysis apparatus. Further, it becomes necessary to be able to surely attach a sample holder that holds a very small and fragile crystalline sponge in which a sample made into a single-crystal is soaked, to the single-crystal X-ray structure analysis apparatus in a relatively easy manner.

Neither holding a single-crystal formed and soaked inside fine pores of a crystalline sponge with a sample holder for performing an analysis with a single-crystal X-ray structure analysis apparatus, nor such configuration that a sample holder for holding the crystalline sponge where this single-crystal is soaked can be surely attached to the single-crystal X-ray structure analysis apparatus in a relatively easy manner is disclosed in Non-Patent Document 1.

The present invention is to provide a single-crystal X-ray structure analysis apparatus capable of surely attaching a sample holder to which the very small and fragile crystalline sponge where the sample is soaked by a soaking machine for the single-crystal X-ray structure analysis apparatus is attached, to a goniometer head with good reproducibility in a relatively easy manner, by solving problems of the above-described conventional technique.

Means to Solve the Problems (1) In order to achieve the above-described object, it is a feature that the single-crystal X-ray structure analysis apparatus according to the present invention is a single-crystal X-ray structure analysis apparatus that performs a structure analysis of a material, the apparatus comprising: an X-ray source that generates X-rays; a goniometer having a goniometer head to which a sample holder is attached, the sample holder holding a porous complex crystal where a sample is soaked; an X-ray irradiation section that irradiates the X-rays to the porous complex crystal whose position is adjusted with the goniometer head; an X-ray detection measurement section that detects and measures X-rays diffracted or scattered by the sample; and a structure analysis section that performs a structure analysis of the sample based on the diffracted or scattered X-rays detected by the X-ray detection measurement section, wherein a positioning portion for positioning the sample holder to be attached is formed on a surface of the goniometer head, the sample holder being attached onto the surface.

(2) Further, it is a feature that in the single-crystal X-ray structure analysis apparatus according to the present invention, the positioning portion comprises a fitting structure for being fitted with the sample holder.

(3) Further, it is a feature that in the single-crystal X-ray structure analysis apparatus according to the present invention, the fitting structure is formed at a tip portion of the goniometer head.

(4) Further, it is a feature that in the single-crystal X-ray structure analysis apparatus according to the present invention, the sample holder comprises a through-hole, a taper portion being formed onto a surface of the through hole, the surface attached to the goniometer head, and the fitting structure has a size to be stored inside the taper portion.

(5) Further, it is a feature that in the single-crystal X-ray structure analysis apparatus according to the present invention, the fitting structure has a hemispherical shape, or a conical shape whose tip portion is rounded.

(6) Further, it is a feature that in the single-crystal X-ray structure analysis apparatus according to the present invention, the fitting structures are formed at a plurality of positions in a portion of the goniometer head where the sample holder is attached to.

(7) Further, it is a feature that the sample holder according to the present invention is a sample holder used in a single-crystal X-ray structure analysis apparatus, the sample holder comprising a base part attached to a goniometer head of a goniometer in the single-crystal X-ray structure analysis apparatus; and a holding part that holds a porous complex crystal capable of soaking a sample in a plurality of fine pores formed therein, the holding part formed on the base part, wherein the base part has a fitting structure formed for being fitted with the goniometer head.

(8) Further, it is a feature that in the sample holder according to the present invention, the fitting structure comprises a taper portion; the base part has a sample introduction structure formed to introduce the sample into the porous complex crystal; and the taper portion is formed on a side attached to the goniometer head of the sample introduction structure.

Effect of the Invention

According to a single-crystal X-ray structure analysis apparatus of the present invention, a sample holder holding a porous complex crystal that is a very small and fragile crystalline sponge in which a sample is soaked can be surely attached to the single-crystal X-ray structure analysis apparatus in a relatively easy manner.

DETAILED DESCRIPTION OF EMBODIMENTS

Figure 1:
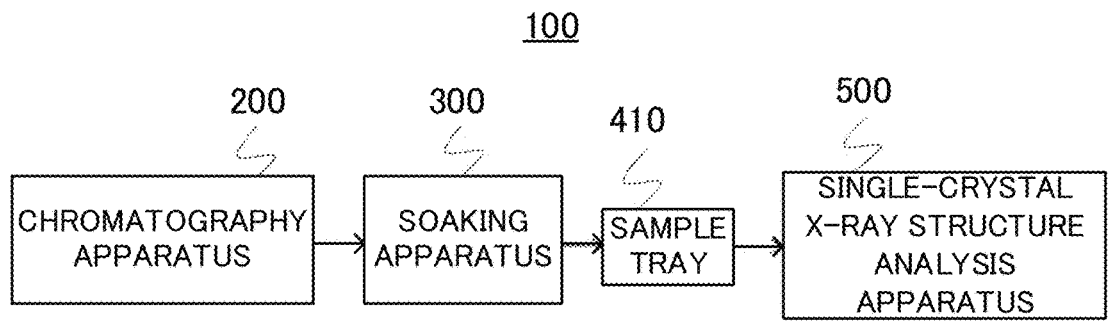
FIG. 1 is a block diagram showing an outline configuration of the entire single-crystal X-ray structure analysis system comprising a single-crystal X-ray structure analysis apparatus relating to the first Example according to the present invention.

The present invention relates to a single-crystal X-ray structure analysis apparatus, and enables surely attaching a sample holder holding a porous complex crystal that is a very small and fragile crystalline sponge in which a sample is soaked by a soaking machine, to a goniometer head with good reproducibility in a relatively easy manner, by forming a plurality of very small protrusion portions matched with a plurality of recess portions formed to the sample holder, onto a goniometer head of the single-crystal X-ray structure analysis apparatus to superpose the recess portions formed to the sample holder on the very small protrusion portions of the goniometer head.

A single-crystal X-ray structure analysis system comprising the single-crystal X-ray structure analysis apparatus using the sample holder holding the porous complex crystal in which the sample is soaked, according to one embodiment of the present invention is described in detail referring to the drawings. In addition, the expression of "A or B" in the present application means "at least one of A and B", and includes "A and B" unless there are exceptional circumstances where there exists no possibility of A and B.

FIG. 1 shows an outline configuration of the entire single-crystal X-ray structure analysis system 100 comprising a single-crystal X-ray structure analysis apparatus relating to the present Example. The single-crystal X-ray structure analysis system 100 relating to the preset Example comprises a chromatography apparatus 200 that extracts an analysis object sample from inside a sample such as a gas sample, a liquid sample or the like; a soaking machine 300 for a single-crystal X-ray structure analysis apparatus (hereinafter, also referred to simply as a soaking machine 300), that prepares a sample for single-crystal X-ray structure analysis from the sample obtained via extraction thereof with the chromatography apparatus 200; a sample tray 410 in which single-crystal X-ray structure analysis samples each prepared by the soaking machine 300 are stored; and a single-crystal X-ray structure analysis apparatus 500 that analyzes each of the samples stored in the sample tray 410, using X-rays.

In addition, the sample may be made to singly move from the soaking machine 300 to the single-crystal X-ray structure analysis apparatus 500 without using the sample tray 410.

Figure 2:
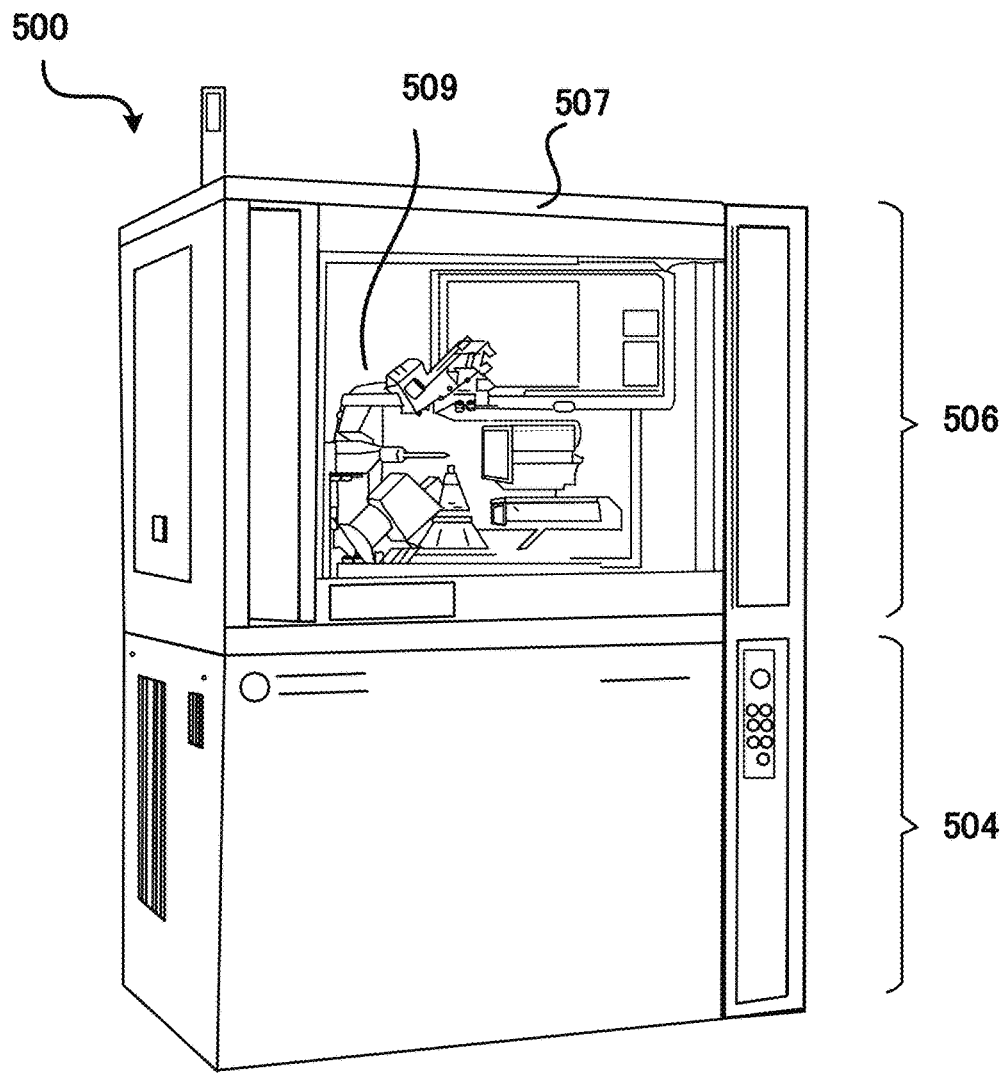
FIG. 2 is a perspective view showing an appearance configuration of the single-crystal X-ray structure analysis apparatus relating to the first Example according to the present invention.

The attached FIG. 2 shows the entire appearance configuration of the single-crystal X-ray structure analysis apparatus comprising a single-crystal X-ray diffractometer according to one embodiment of the present invention, and as is clear from the figure, the single-crystal X-ray structure analysis apparatus 500 comprises a base stand 504 in which a cooling device and an X-ray generation power supply unit are stored, and an X-ray protection cover 506 placed on the base stand 504.

The X-ray protection cover 506 is provided with a casing 507 for surrounding the single-crystal X-ray diffractometer 509, a door provided in front of the casing 507, and so forth. The door provided in front of the casing 507 is openable, and in this open state, various operations can be performed for the internal single-crystal X-ray diffractometer 509. In addition, the present embodiment as shown in the figure is directed to the single-crystal X-ray structure analysis apparatus 500 provided with the single-crystal X-ray diffractometer 509 for performing a structure analysis of a material using the crystalline sponge mentioned below.

Figure 3:
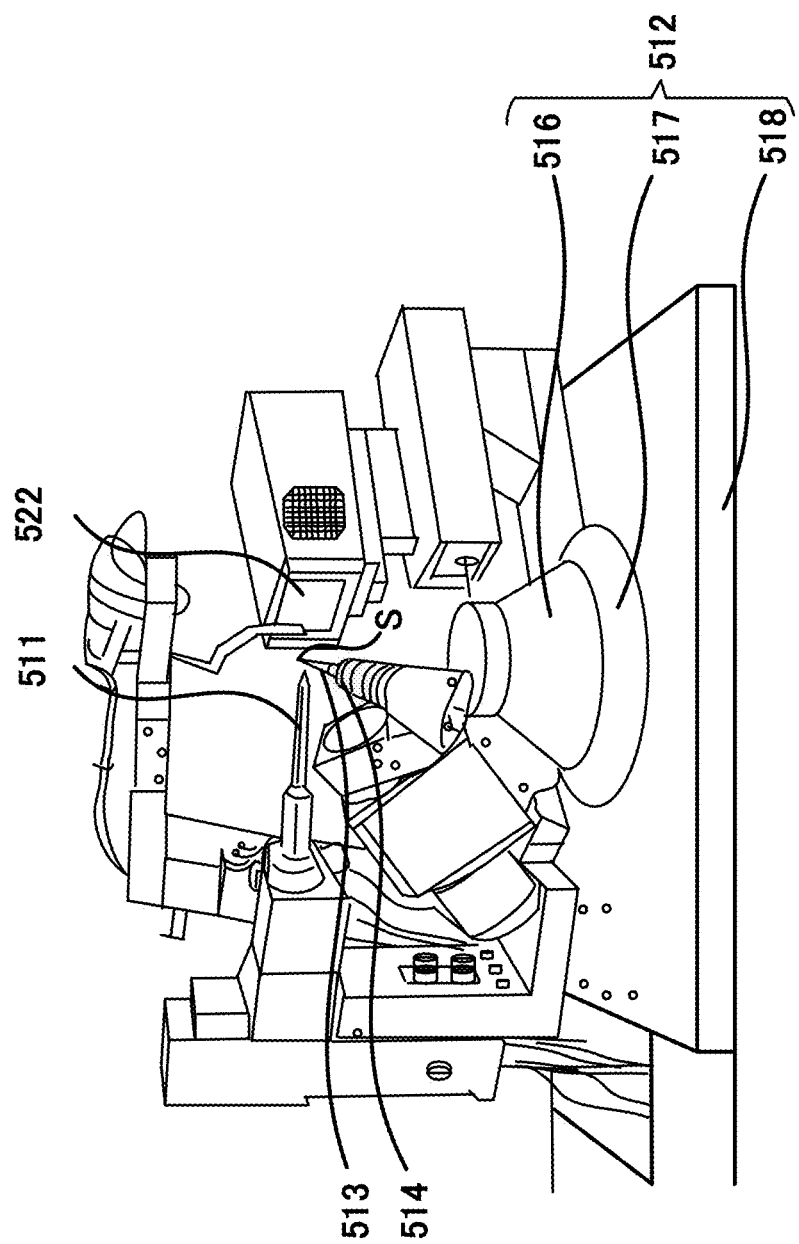
FIG. 3 is a perspective view showing a configuration of a measurement section in the single-crystal X-ray structure analysis apparatus according to the present invention.

The single-crystal X-ray diffractometer 509 comprises an X-ray tube 511 and a goniometer 512, as shown in FIG. 3 as well. The X-ray tube 511 comprises a filament, a target (referred to also as "anticathode") arranged so as to be opposed to the filament, and a casing for airtightly storing them, though not shown in the figure herein. This filament subjected to current applied by the X-ray generation power supply unit stored in the base stand 504 of FIG. 2 generates heat to emit thermal electrons.

Further, a high voltage is applied between the filament and the target by the X-ray generation power supply unit, and the thermal electrons emitted from the filament are accelerated by the high voltage, and collide with the target. This collision area forms an X-ray focus, and X-rays are generated from the X-ray focus, and are spread out. In more detail, though not shown in the figure herein, the X-ray tube 511 comprising a microfocus tube and an optical element such as a multilayer focusing mirror or the like enables irradiation with higher brightness beam, and can also be selected from a radiation source such as Cu, Mo, Ag or the like. As exemplified above, the filament, the target arranged so as to be opposed to the filament, and the casing for airtightly storing them serve as an X-ray source, and a configuration for X-ray irradiation comprising the microfocus tube and the optical element such as the multilayer focusing mirror or the like serves as an X-ray irradiation section.

Further, a goniometer 512 supporting a sample S to be analyzed comprises a θ rotation table 516 that is rotatable with a sample axis line w passing through an X-ray incident point of the sample S as a center, and a 2θ rotation table 517 that is arranged around the θ rotation table and is rotatable with the sample axis line ω as a center. A goniometer head 514 onto which the sample S is attached is provided to the goniometer 512. In addition, according to the present embodiment, the sample S is soaked inside a crystalline sponge previously attached to a part of the sample holder 513 mentioned below.

Driving devices (not shown in the figure) for driving the above-described θ rotation table 516 and 2θ rotation table 517 are stored inside a base 518 of the goniometer 512, and the θ rotation table 516 is driven by these driving devices to be intermittently or continuously rotated at a predetermined angular speed so as to make a so-called θ rotation. Further, the 2θ rotation table 517 is driven by these driving devices to be intermittently or continuously rotated so as to make a so-called 2θ rotation. The above-described driving devices can be constituted from any structure, and for example, can be constituted from a power transmission structure comprising a worm and a worm wheel.

An X-ray detector 522 is placed on a part of the outer periphery of the goniometer 512, and the X-ray detector 522 is constituted from for example, CCD type and CMOS type two-dimensional pixel detectors, a hybrid type pixel detector, or the like. In addition, an X-ray detection measurement section means a configuration in which X-rays diffracted or scattered by the sample are detected and measured, and comprises the X-ray detector 522 and a control section that controls the same.

The single-crystal X-ray diffractometer 509 is constituted as described above, and thus the sample S is θ-rotated with the sample axis line ω as a center by the θ rotation of the θ rotation table 516 in the goniometer 512. During the θ rotation of this sample S, X-rays generated from the X-ray focus inside the X-ray tube 511, that is directed to the sample S enter the sample S at a predetermined angle, and are diffracted/scattered. That is, the incident angle of X-rays entering the sample S changes depending on the θ rotation of the sample S.

When the Bragg diffraction condition between an incident angle of X-rays entering the sample S and a crystal lattice plane is satisfied, diffraction X-rays are generated from the sample S. The diffraction X-rays are received by the X-ray detector 522 to measure an X-ray intensity thereof. From those described above, an angle of the X-ray detector 522 with respect to the incident X-rays, that is, an intensity of the diffraction X-rays corresponding to a diffraction angle is measured, and a crystal structure concerning the sample S and so forth are analyzed from this measurement result.

Figure 4A:
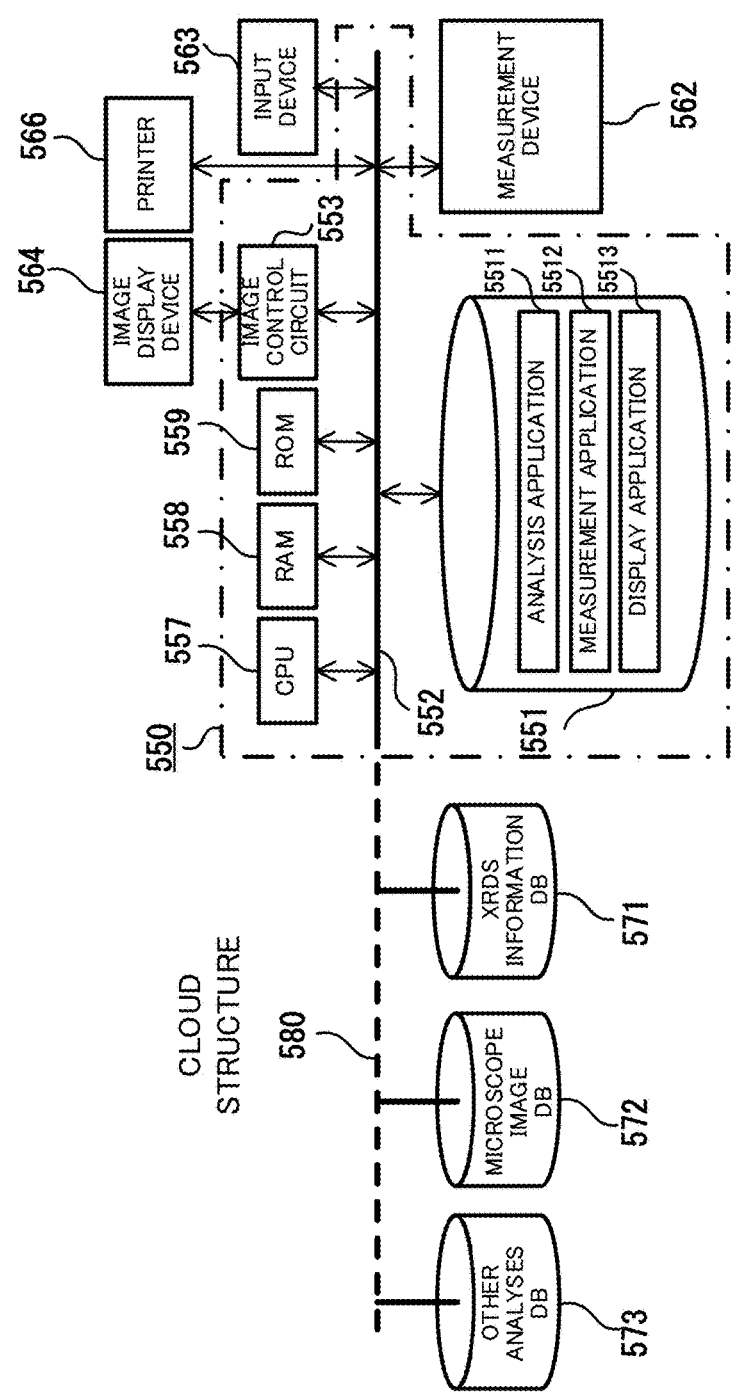
FIG. 4A is a block diagram showing one example of the detail of an electrical internal configuration of the single-crystal X-ray structure analysis apparatus according to the present invention.

Next, FIG. 4A shows one example of the detail of an electrical internal configuration constituting a control section 550 in the above-described single-crystal X-ray structure analysis apparatus 500. In addition, as a matter of course, the present invention is not limited to the following embodiments according to the present invention.

This single-crystal X-ray structure analysis apparatus 500 includes the above-described internal configuration and further comprises a measurement device 562 for measuring a suitable material used as a sample; an input device 563 constituted from a keyboard, a mouse and so forth; an image display device 564 as display means; a printer 566 as means for printing and outputting the analysis result; CPU (Central Processing Unit) 557; RAM (Random Access Memory) 558; ROM Read Only Memory) 559; a hard disk as an external storage medium, and so forth. These elements are mutually connected by a bus 552.

The image display device 564 constituted from an image display unit such as a CRT display, a liquid-crystal display or the like displays an image on a screen in accordance with an image signal generated by an image control circuit 553. The image control circuit 553 generates the image signal based on image data input therein. The image data input in the image control circuit 553 is generated by an operation of every kind of calculation means, achieved by a computer that includes an analysis section 551 comprising CPU 557, RAM 558, ROM 559, and a hard disk.

An inkjet plotter, a dot printer, an inkjet printer, an electrostatic transfer printer, or any other printing unit having arbitrary structure is usable for the printer 566. In addition, the analysis section 551 can also constitute from a magneto-optical disk, a semiconductor memory, or any other storage medium having arbitrary structure other than the hard disk.

Analysis application software 5511 for managing the overall operation of the single-crystal X-ray structure analysis apparatus 500, measurement application software 5512 for managing the operation of the measurement processing using the measurement device 562, and display application software 5513 for managing the operation of the display processing using the image display device 564 are stored inside the analysis section 551 for performing structure analysis processing of the single-crystal by providing the hard disk. A predetermined function is achieved after reading these pieces of application software from the hard disk in the analysis section 551, as needed, to transfer them to RAM 558.

This single-crystal X-ray structure analysis apparatus 500 further comprises for example, a database placed in a cloud area, the database for storing every kind of measurement results including measurement data obtained by the above-described measurement device 562. Referring to an example of the figure, as is explained below, shown are an XRDS information database 571 that stores XRDS image data obtained by the above-described measurement device 562, and a microscope image database 572 that stores actually observed images obtained by the microscope, and further shown are for example, measurement results obtained via analysis performed with XRF, not X-rays but Raman ray or the like, and another analysis database 573 that stores physical property information. In addition, these databases are not necessarily stored inside the single-crystal X-ray structure analysis apparatus 500, and for example, they may be provided outside and be communicably connected mutually via a network 580 or the like.

Figure 4B:
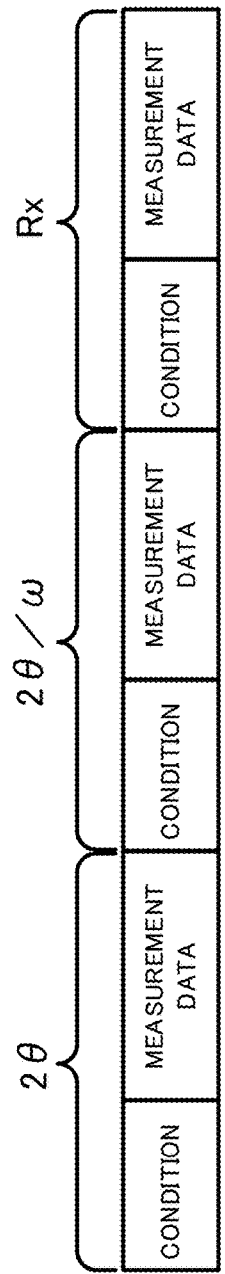
FIG. 4B is a block diagram showing one example of a data file configuration of the electrical internal configuration of the single-crystal X-ray structure analysis apparatus according to the present invention.

A method of storing individual measurement data inside an individual file is also taken into account as a file management method for storing a plurality of pieces of measurement data inside a data file, but according to the present embodiment, as shown in FIG. 4B, the plurality of pieces of measurement data are set to be continuously stored inside one data file. In addition, referring to FIG. 4B, storage areas each in which "condition" is written are an area for storing every kind of information including device information and measurement conditions when obtaining the measurement data.

As such measurement conditions, (1) name of measurement object material, (2) type of measurement device, (3) measurement temperature range, (4) measurement start time, (5) measurement end time, (6) measurement angle range, (7) moving speed in scanning movement system, (8) scanning condition, (9) type of X-rays incident on sample, (10) whether or not to use attachments such as a sample high-temperature device, and so forth, are conceivable and every kind of other conditions is also conceivable.

Figure 5:
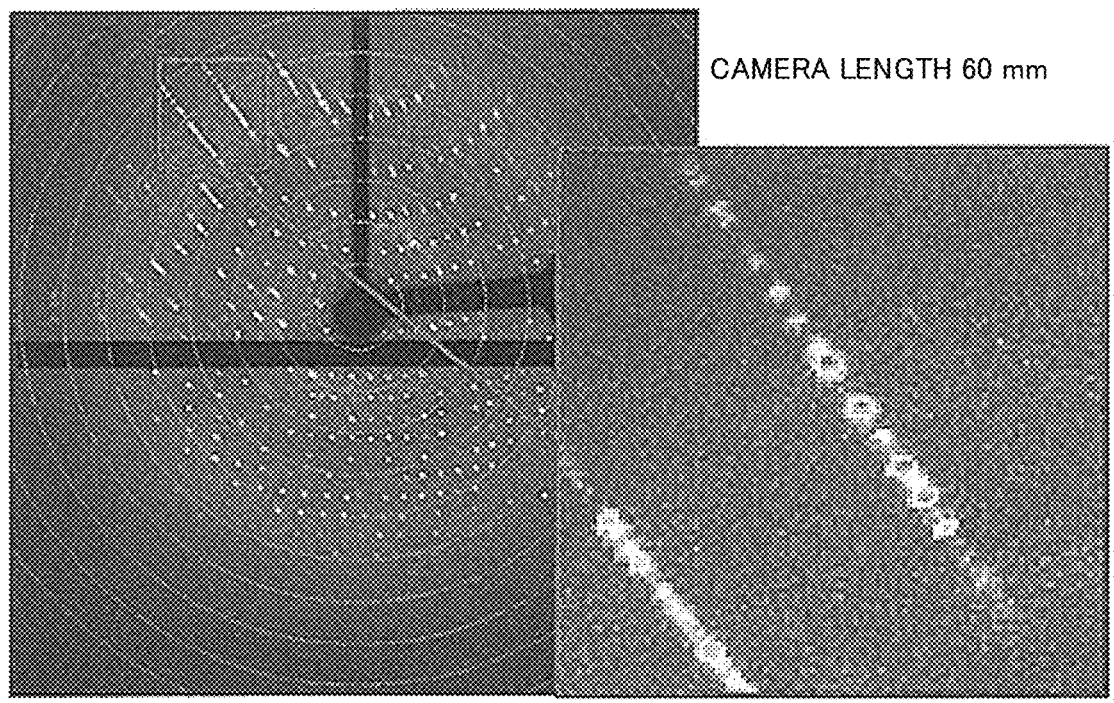
FIG. 5 is a view showing an image of an XRDS pattern observed by the single-crystal X-ray structure analysis apparatus according to the present invention.

An XRDS (X-ray Diffraction and Scattering) pattern or an image (Refer to FIG. 5) is obtained by receiving/accumulating X-rays received on a flat plane that is a two-dimensional space of the X-ray detector 522 constituting the above-described measurement device 562 for each pixel arranged in planar array (for example, CCD or the like), that constitutes the detector, and by measuring an intensity thereof. For example, a pattern or an image on a two-dimensional space of r and θ can be obtained by detecting the intensity of X-rays received via an integral, for each pixel of the X-ray detector 522.

<Measurement Application Software>

The XRDS pattern or the image on an observation space, that is obtained by diffraction and scattering of X-rays caused by an object material for irradiation of the X-rays reflects information of an electron density distribution in an actual space of the object material. However, the XRDS pattern being on the two-dimensional space of r and θ does not directly represents symmetry in the actual space of the object material as a three-dimensional space. Accordingly, it is generally difficult to specify the (spatial) arrangement of atoms and molecules that constitute the material with only the existing XRDS image, and thus a specialized knowledge of X-ray structure analysis is required. Therefore, according to the present example, automatization is achieved by adopting the above-described measurement application software. In this manner, the single-crystal X-ray structure analysis apparatus 500 receives and manages every kind of measurement results including measurement data obtained by detecting X-rays diffracted or scattered by a sample with the X-ray detection measurement section while controlling a measurement processing operation using the measurement device 562. Further, the sample is subjected to structure analysis with a structure analysis section, based on every kind of measurement results including the measurement data obtained by detecting the X-rays diffracted or scattered by the sample.

Figure 6A:
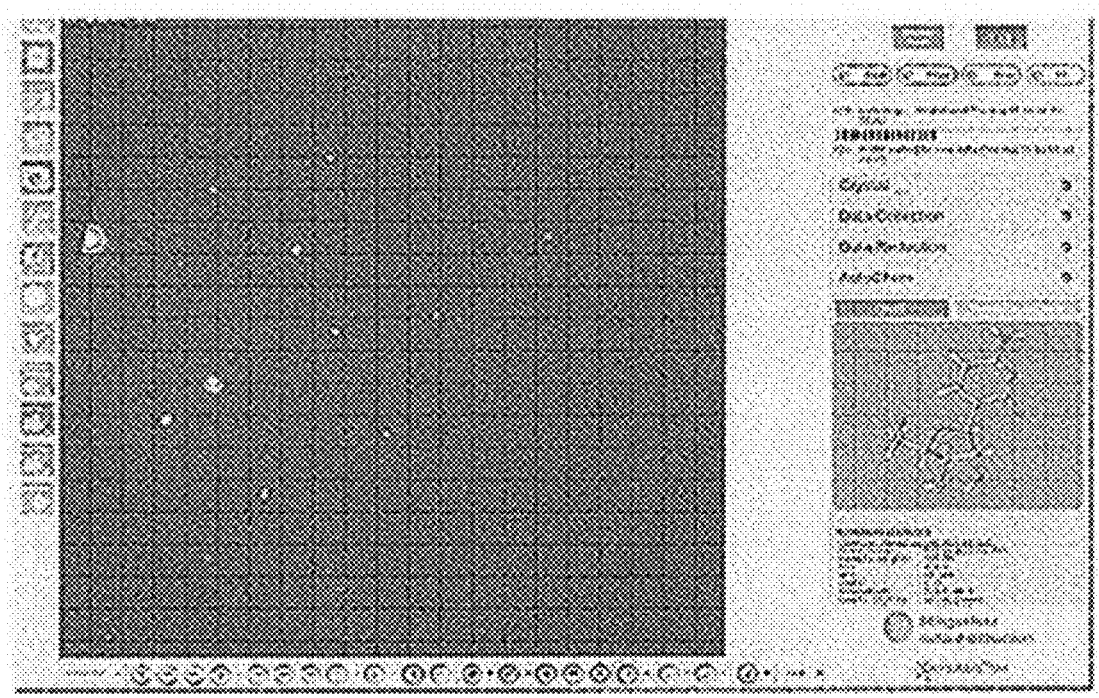
FIG. 6A is a front view showing an execution screen of an application software for the measurement of the single-crystal X-ray structure analysis apparatus according to the present invention.
Figure 6B:
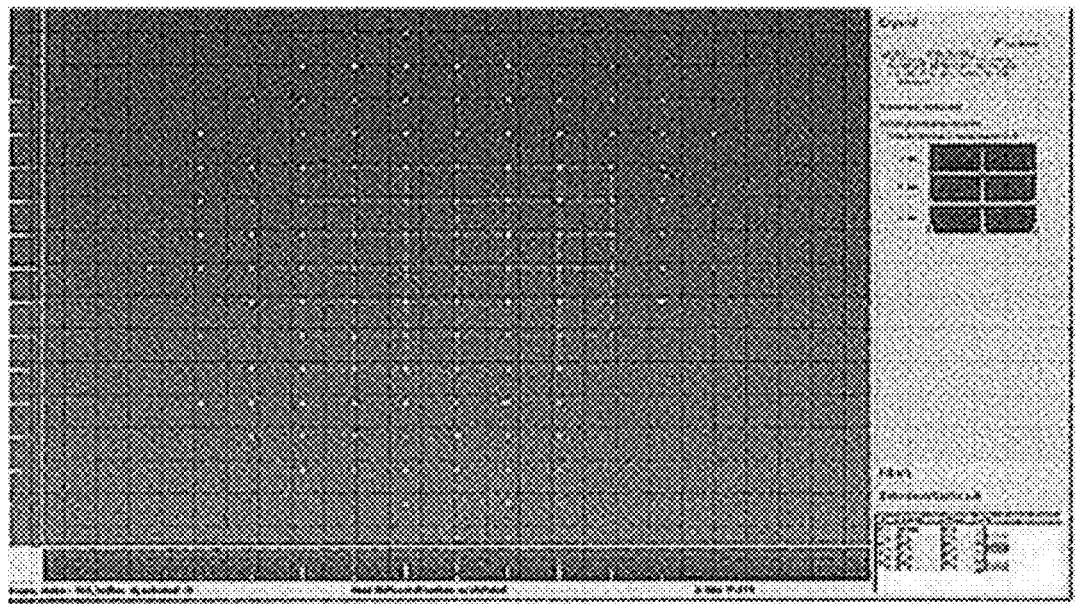
FIG. 6B is a front view showing another execution screen of an application software for the measurement of the single-crystal X-ray structure analysis apparatus according to the present invention.
Figure 7:
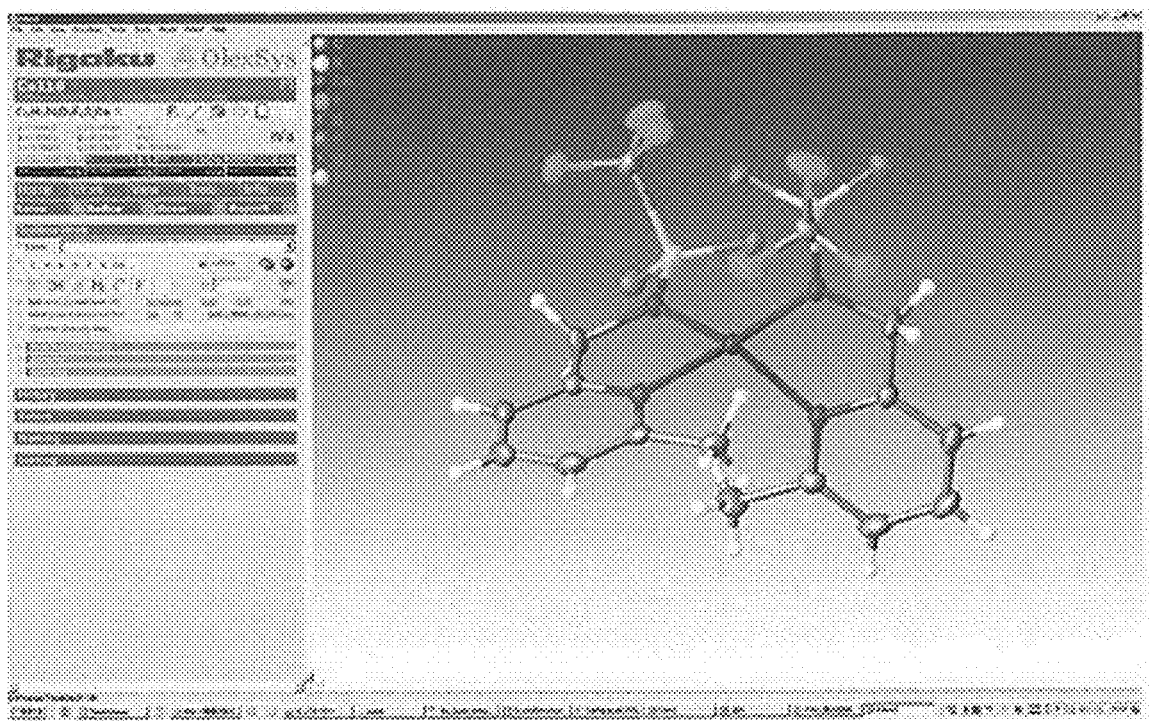
FIG. 7 is a front view of a screen displaying a molecular model prepared using a structure analysis program of the single-crystal X-ray structure analysis apparatus according to the present invention.

For one example, as shown in the execution screens of FIGS. 6A and 6B, X-ray diffraction data measurement/processing software called "CrysAlis$^{Pro}$" that is a platform for single-crystal structure analysis is installed to execute preliminary measurement, setting of measurement conditions, main measurement, data processing and so forth. Further, structure analysis and structure refinement are executed in parallel with X-ray diffraction data collection by installing an automatic structure analysis plug-in called "AutoChem". Then, from space group determination to phase determination, construction and correction of molecular modelling, structure refinement, final reporting, and preparation of a CIF file are executed by a structure analysis program called "Olex$^2$" as also shown in FIG. 7.

The whole structure of the single-crystal X-ray structure analysis apparatus 500, and its function have been described as above, and a crystalline sponge according to the present invention, and devices and tools related thereto are specifically described below in detail, referring to the attached drawings.

<Crystalline Sponge>

As described above, the single-crystal X-ray structure analysis has become widely applicable for those including a liquid compound that cannot be crystallized, a very small amount of a sample with several ng to several μg that is incapable of acquiring a sufficient amount to perform crystallization, or the like via development of a material called "crystalline sponge" as a very small and fragile porous complex crystal having an approximate size of several 10 μm to several 100 μm, in whose inside countless pores each having a diameter of 0.5 to 1 nm are formed.

However, in the current situation, in order to perform soaking (post-crystallization) as crystallization of a sample into a framework of the above-described crystalline sponge, as previously described, required is a step of soaking a very small amount of a sample, approximately several ng to several μg, separated by every kind of pretreatment (separation) devices in a framework of a very small and fragile crystalline sponge having an outer diameter of approximately 100 μm provided via immersion in a preserving solvent (carrier) such as cyclohexane or the like, inside a container. Examples of the preserving solvent (carrier) include liquid, a gaseous body (gas), and a supercritical fluid in the middle of them. Subsequently, further required is a step of taking out, from a container, a very small, fragile and difficultly handleable crystalline sponge in a quick manner (in a short period of time in such an extent that the crystalline sponge is not broken due to drying), and accurately attaching it to an X-ray irradiation position inside a diffractometer, more specifically, to a tip portion of a sample axis of the goniometer 512 (so-called goniometer head pin) while performing centering.

These steps are not only fine operations for which high preciseness is required but also those for which rapidness is required for the operator, regardless of presence/absence of a specialized knowledge of X-ray structure analysis, thereby resulting in having a large influence on the measurement result of a sample after being soaked in the crystalline sponge. That is, these operations make single-crystal X-ray structure analysis using a very small crystalline sponge result in low yield, and thus this becomes one of the causes of suppressing the single-crystal X-ray structure analysis using the crystalline sponge from being widely used.

The present invention that has been accomplished based on the above-described inventor's knowledge enables quickly, surely and easily performing a single-crystal X-ray structure analysis with a very small and fragile crystalline sponge by using a sample holder for the crystalline sponge (also referred to simply as a sample holder) as described below, in other words, achieves a high-yield, efficient, very versatile and user-friendly single-crystal X-ray structure analysis apparatus.

That is, as to the next-generation single-crystal X-ray structure analysis apparatus according to the present invention, there is a large constraint that the very small and fragile crystalline sponge in which a very small amount of a sample S is soaked is prepared, and further the sample S (crystalline sponge) needs to be taken up from a soaking container and precisely and attached to a predetermined position at the tip portion of the goniometer, but specifically in order to achieve the very versatile and user-friendly apparatus, such operations need to be made quickly and easily executable without requiring highly specialized knowledge as well as operation precision (preciseness).

The present invention described below in detail resolves such a problem, that is, provides an apparatus and a method for performing a high-yield efficient, very versatile and user-friendly single-crystal X-ray structure analysis in a quick, sure and easy manner by anyone while also using a very small, sponge; and further provides a sample holder as a tool therefor.

Example 1

According to the configuration of the single-crystal X-ray structure analysis system 100 comprising the single-crystal X-ray structure analysis 500 relating to the first Example according to the present invention as shown in FIG. 1, the configuration of the soaking machine 300 for soaking an analysis object sample in a crystalline sponge is explained referring to FIGS. 8 to 14.

Figure 8:
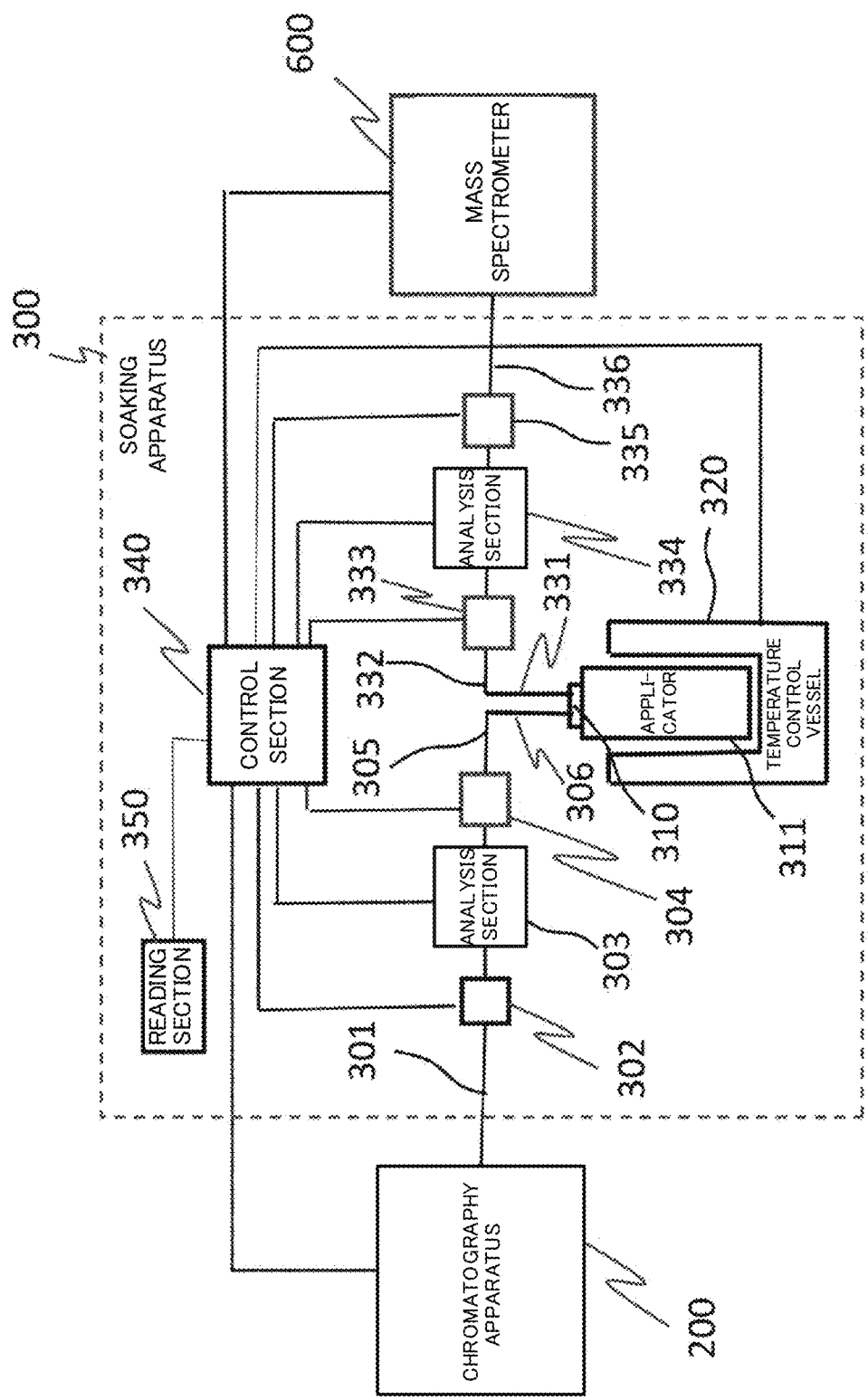
FIG. 8 is a block diagram showing a configuration of a soaking machine relating to the first Example according to the present invention.

FIG. 8 is a block diagram showing a configuration of the soaking machine 300 for the single-crystal X-ray structure analysis apparatus 500 relating to the first Example according to the present invention. The soaking machine 300 relating to the present example comprises a supply side pipe 301, a supply side first actuator 302, a supply side analysis section 303, a supply side second actuator 304, a supply side pipe 305, an injection needle (injection pipe) 306, an applicator 311 into which a sample holder 310 (corresponding to the sample holder 513 in FIG. 3) is attached, a temperature controller (thermostat) 320, a discharge needle (discharge pipe) 331, a discharge pipe 332, a discharge side first actuator 333, a discharge side analysis section 334, a discharge side second actuator 335, a discharge side pipe 336, a control section 340, and a reading section 350.

According to the soaking machine 300, a carrier or a solvent (hereinafter, referred to as a sample inclusive of each of these) containing an analysis object sample (gas, liquid, supercritical fluid, or the like) that has been supplied from a separation apparatus (for example, gas chromatography, liquid chromatography or the like) 200 is supplied through the supply side piping 301, and a flow rate, a pressure and so forth of the sample are adjusted by the supply side first actuator 302.

Figure 9:
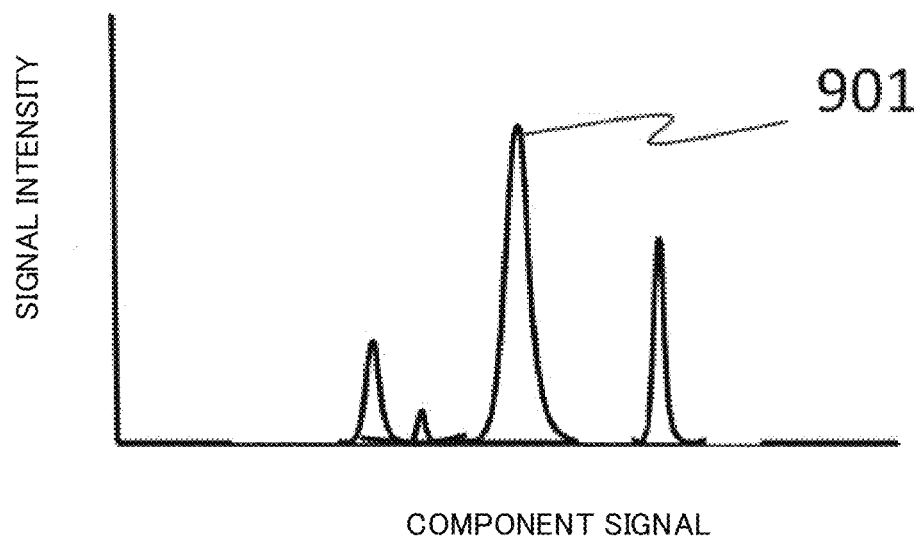
FIG. 9 is a graph showing one example of an output waveform of a sensor on the supply side in the above-described soaking machine.

Next, the analysis object sample is sent to the supply side analysis section 303, and components of the sample whose pressure, concentration and temperature are adjusted are analyzed. One example of the analysis results is shown in FIG. 9. The graph of FIG. 9 shows that the sample sent from the separation apparatus 200 has a peak 901 in signal intensity at a specific component.

The sample that has been analyzed by the supply side analysis section 303 is sent from the supply side pipe 305 to the injection needle 306 whose tip portion is inserted in the sample holder 310 attached into the applicator 311, and is supplied to the sample holder 310 inside the applicator 311 from the tip portion of the injection needle 306. The injection needle 306 is driven by drive means that is not shown in the figure, and is inserted in the sample holder 310 attached into the applicator 311.

The temperature controller 320 is controlled by the control section 340 in this state, and the applicator 311 is heated or cooled in such a manner that the applicator 311 comprising the sample holder 310 reaches a desired temperature.

An excessive sample out of the sample supplied inside the applicator 311 is discharged via the discharge pipe 332 from the discharge needle 331 inserted into the sample holder 310 whose tip portion is attached into the applicator 311 by operating the discharge side first actuator 333, after elapse of a predetermined time in a state where the sample is injected from the injection needle 306 into the sample holder 310 attached into the applicator 311 whose temperature is controlled by the temperature controller 320. That is, the excessive sample means a sample discharged according to the length of the discharge needle 331. The discharge needle 331 is driven by the drive means that is not shown in the figure, and is inserted into the sample holder 310.

In this manner, the sample is sent to the injection needle 306 on the supply side from the supply side pipe, and is supplied to the sample holder 310 inside the applicator 311 from the tip portion of the injection needle 306 on the supply side. Only the sample, or a solution in which the sample and the preserving solvent (carrier) are mixed is supplied by flowing inside the injection needle 306 on the supply side. Accordingly, a very small amount of the sample S introduced thereto comes into contact with the crystalline sponge attached to the tip of the pin-shaped holding part of the sample holder 310 inside the storing space 301 of the applicator 300, and the sample is soaked therein. In addition, examples of the electrophoresis device herein include various electrophoresis devices concerning capillary electrophoresis, isoelectric point electrophoresis, and so forth. When using the soaking machine 300, in a state where the sample is injected, the excessive sample or a solution in which the sample and the preserving solvent (carrier) are mixed is discharged from the discharge needle 331 on the discharge side, after a predetermined time has elapsed. When not using the soaking machine 300, the unnecessary preserving solvent (carrier) or solution flows inside the discharge needle 331 on the discharge side, and is discharged. Accordingly, it is possible that no sample flows through the discharge needle 331 on the discharge side. When using gas or supercritical fluid as a carrier, the carrier containing the sample is discharged.

Figure 10:
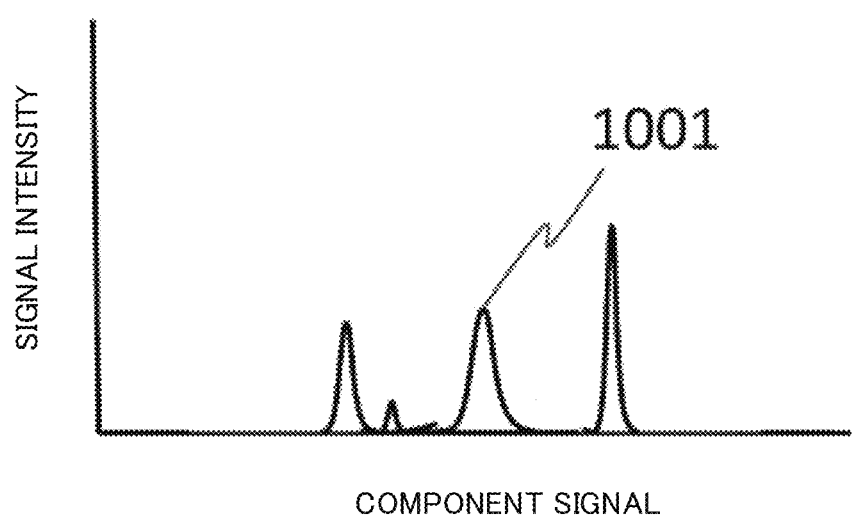
FIG. 10 is a graph showing one example of an output waveform of a sensor on the discharge side in the above-described soaking machine.

As to a sample discharged from inside the applicator 311 by the discharge side first actuator 333, its component is analyzed by the discharge side analysis section 334. One example of the result obtained by the analysis is shown in FIG. 10. The sample discharged from inside the applicator 311, whose component is analyzed by the discharge side analysis section 334 is sent to a mass spectrometer 600 from the discharge side pipe 336 by adjusting a pressure, a flow rate, or a concentration with the discharge side second actuator 335 to analyze the mass component.

Herein, it is understood that the peak 1001 at the component in the graph of FIG. 10, that corresponds to the component signal at which the intensity peak 901 is shown in FIG. 9 is lowered when comparing the graph of FIG. 10 obtained via analysis performed by the discharge side analysis section 334 with the graph of FIG. 9 obtained via analysis performed by the supply side analysis section 303. This means that a part of component at which the peak is shown in FIG. 9 is consumed inside the applicator 311.

It is determined that an analysis object sample is soaked in a crystalline sponge attached to a tip portion of the sample holder 310 attached into the applicator 311 at the time when the difference or ratio between both the peak values becomes a predetermined value by comparing data as shown in the FIG. 9 with data as shown in FIG. 10 via the control section 340, followed by completing a series of operations.

Figure 11:
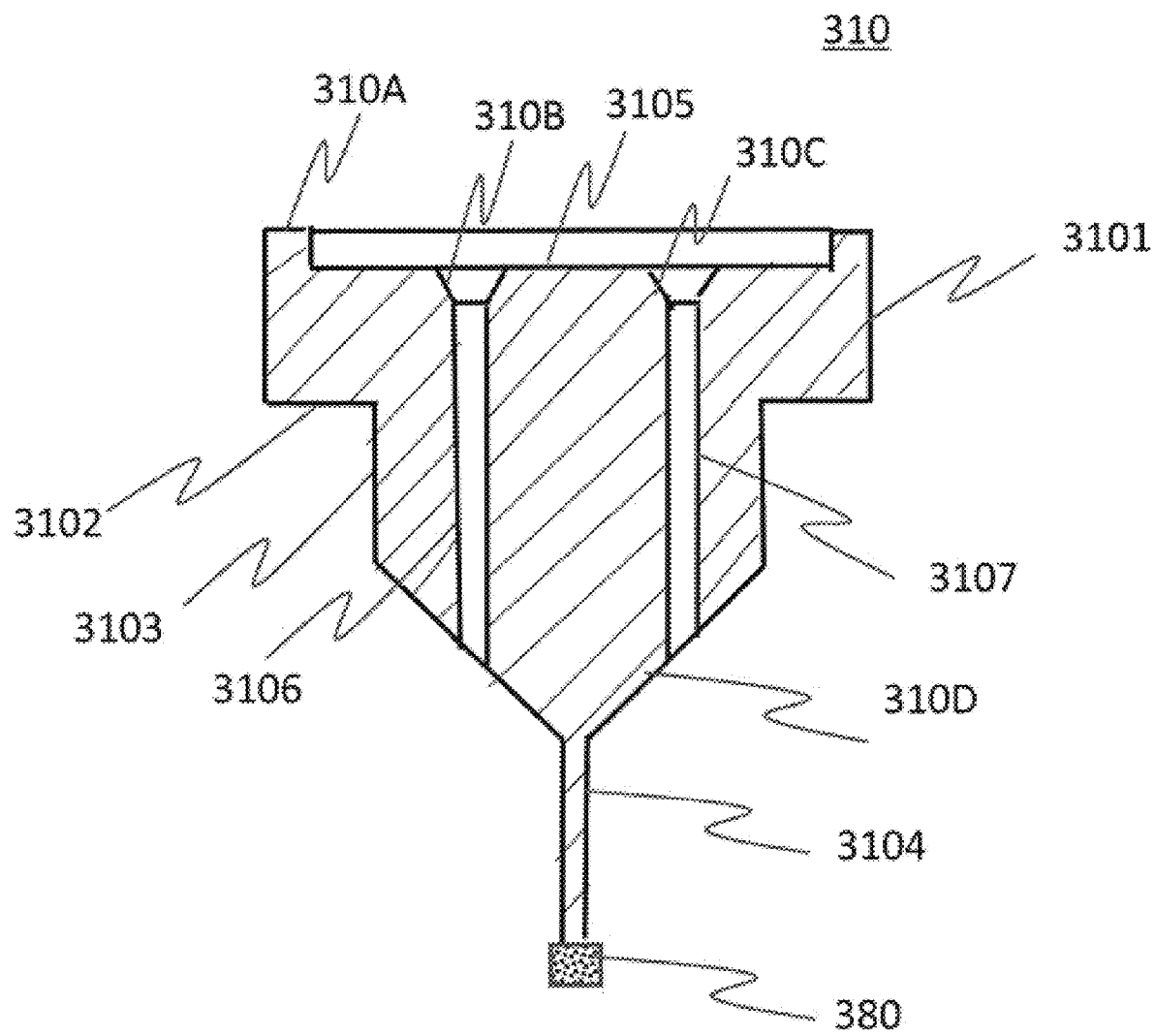
FIG. 11 is a sectional view showing a sample holder for soaking a sample in the above-described soaking machine.

A sectional view when the sample holder 310 is viewed from the front surface is shown in FIG. 11. The sample holder 310 is formed with a flat surface 3102 at one end of the base portion 3101 supported by a handling operator. A trunk portion 3103 whose outer diameter is smaller than that of the base portion 3101 is formed at a tip of the flat surface 3102; a guide surface 310D processed into a taper shape is formed at a tip of the trunk portion 3103; and a thin pin 3104 is formed in the tip portion.

A recess portion 3105 as a positioning member for attaching the sample holder to the goniometer head 514 in the single-crystal X-ray structure analysis apparatus 500 is formed on the upper surface 310A of the figure, that is another end surface of the base portion 3101. Further, an injection needle hole 3106 and a discharge needle hole 3107 each passing through the trunk portion 3103 from the base portion 3101 are formed in the sample holder 310. The taper portions 310B and 310C each processed into a taper shape are formed on the respective end surfaces on the recess portion 3105 side in the injection needle hole 3106 and the discharge needle hole 3107. The taper portions 310B and 310C become guide surfaces when inserting the injection needle 306 and the discharge needle 331.

The entire sample holder 310 or the recess portion 3105 as a part of the base portion 3101 is formed of a magnetic material for magnetic connection with the magnetic material in the tip portion of the goniometer head 514.

The crystalline sponge 380 in which an analysis sample is soaked is attached (adheres) to the tip portion of the pin 3104. This crystalline sponge 380 is formed of a different component depending on a type of analysis object sample.

Figure 12:
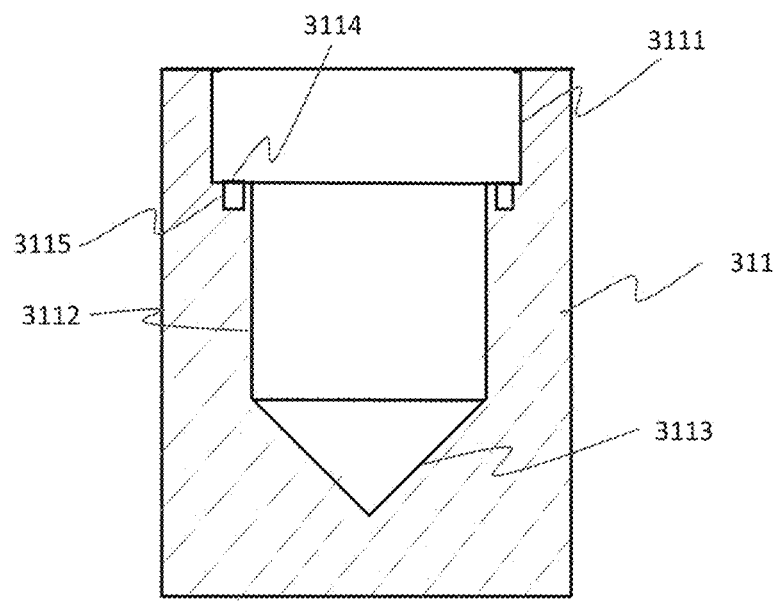
FIG. 12 is a sectional view showing an applicator that stores the above-described sample holder.

FIG. 12 shows a cross-section of the applicator 311 into which the sample holder 310 is attached. The appearance of the applicator 311 is cuboid-shaped. A cylindrical portion 3111 in which the base portion 3101 of the sample holder 310 is inserted, another cylindrical portion 3112 in which the trunk portion 3103 of the sample holder 310 is inserted, and a conical portion 3113 in which the sample is stored are formed for the applicator 311. Further, an O-ring groove 3115 is formed on a stepped surface 3114 between the cylindrical portion 3111 and the other cylindrical portion 3112.

Further, applicators 311 each formed of a resin are differentiated by colors, according to a type of crystalline sponge 380 attached to the tip portion of the pin 3104 of the sample holder 310 attached therein. This can determine the type of crystalline sponge 380 attached to the tip of the pin 3104 of the sample holder 310 from the color of the applicator 311 in a state where the sample holder 310 is attached into the applicator 311.

Figure 13:
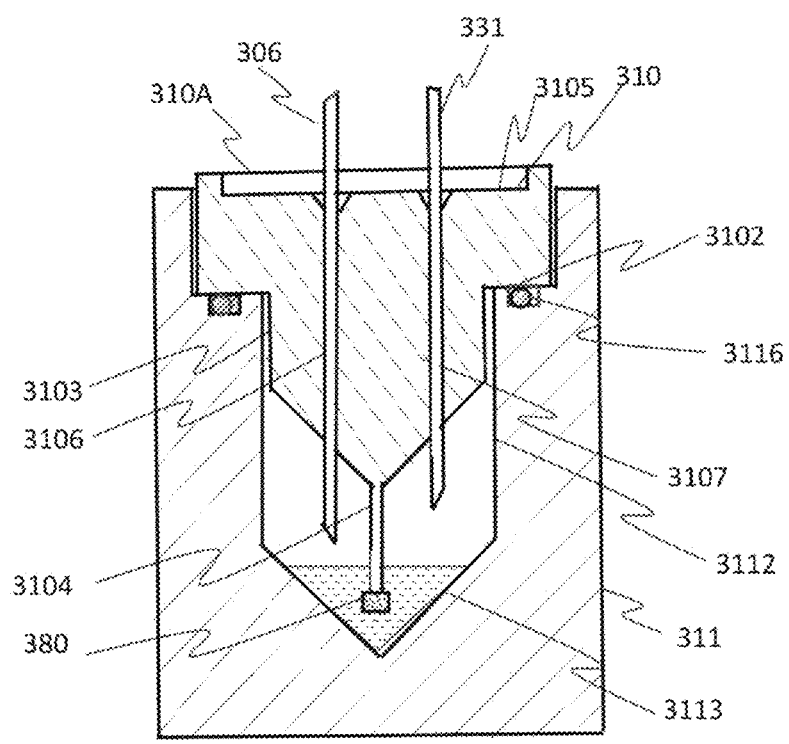
FIG. 13 is a sectional view showing a state where the above-described sample holder is stored in the applicator.

FIG. 13 shows a situation in which the crystalline sponge 380 attached to the tip portion of the pin 3104 of the sample holder 310 soaks the sample in a state where the sample holder 310 is attached to the applicator 311, and further, the injection needle 306 and the discharge needle 331 in the soaking machine 300 are inserted into the vicinity of the crystalline sponge 380 at the tip portion of the pin 3104, and thus the injection needle 306 is inserted deeper into the applicator 311 than the discharge needle 331.

In this state, the sample holder 310 is pressed to the applicator 311 by pressing means that is not shown in the figure, and thus the O-ring 3116 is deformed by pressing the O-ring 3116 attached to the O-ring groove 3115 where the flat surface 3102 of the base portion 3101 of the sample holder 310 is formed on the stepped surface 3114 of the applicator 311.

Further, sealing by seal means that is not shown in the figure is applied between the injection needle 306 and the injection needle hole 3106, and between the discharge needle 331 and the discharge needle hole 3107 in the soaking machine 300. By having such a configuration, the cylindrical portion 3112 in the applicator 311 into which the sample holder 310 is attached, and the conical portion 3113 can be made to maintain an airtight state to the outside.

In addition, the state shown in the above-described FIG. 13 exhibits a state where the injection needle 306 and the discharge needle 331 as shown in the above-described FIG. 8 are inserted in the sample holder 310 and the applicator 311. However, in FIG. 8, it is omitted to display the pressing means.

In addition, according to the configuration shown in FIG. 8, the mass spectrometer 600 has been described as a different configuration from the soaking machine 300, but the mass spectrometer 600 may be a part of the soaking machine 300 by integrating the mass spectrometer 600 with the soaking machine 300.

Figure 14:
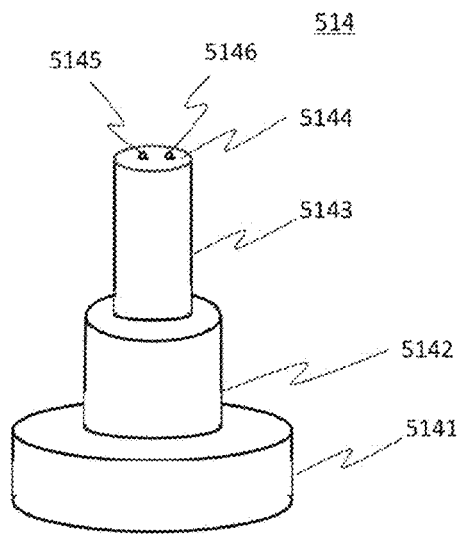
FIG. 14 is a perspective view showing a goniometer head of the single-crystal X-ray structure analysis apparatus, to which the above-described sample holder is attached.

In FIG. 14, an outline configuration of the goniometer head 514 is shown by a perspective view. As shown in FIG. 3, the goniometer head 514 is attached to the goniometer 512. The goniometer head 514 comprises a mounting part 5141 for being attached and fixed to the goniometer 512, an XYZ direction moving mechanism part 5142, and a sample attachment part 5143 for attachment of the sample holder 310.

The tip portion 5144 of the sample attachment part 5143 is formed to be plane-shaped. A protrusion portion 5145 is formed at the position corresponding to a taper portion 310B for injection needle guide, that is formed at the entrance of the injection needle hole 3106 in the sample holder 310 in this plane-shaped portion in a state where the sample holder 310 is attached thereto. Further, a protrusion portion 5146 is formed at the position corresponding to a taper portion 310C for discharge needle guide, that is formed at the entrance of the discharge needle hole 3107 in the sample holder 310.

The protrusion portions 5145 and 5146 that are fitted with the taper portions 310B and 310C in the sample holder 310, respectively, are formed in such a size as being stored inside each of the taper portions 310B and 310C, when the sample holder 310 is attached thereto. Further, the protrusion portions 5145 and 5146 each have a hemispherical shape, or a conical shape whose tip portion is rounded.

Figure 15:
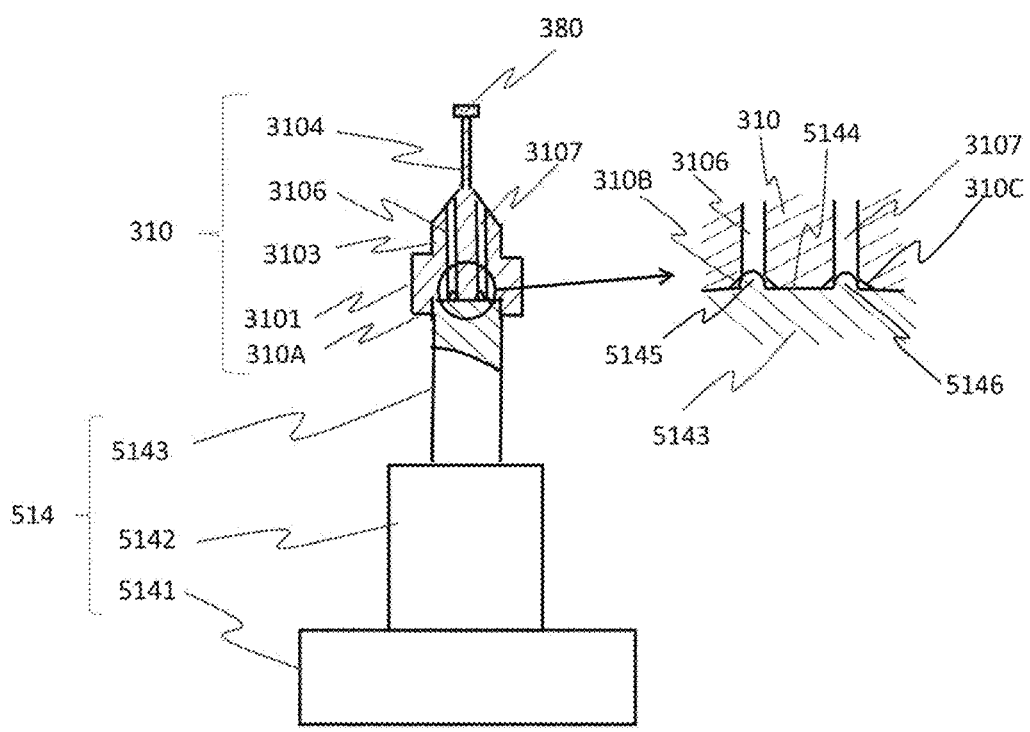
FIG. 15 is a front view including a partial cross-section, that shows a state where the above-described sample holder is attached to the goniometer head of the single-crystal X-ray structure analysis apparatus.

FIG. 15 shows a front view including a partial cross-section when viewing a state where the sample holder 310 is attached to the sample attachment part 5143 of the goniometer head 514, from the front; and an enlarged view of a portion surrounded with a circle in the figure is shown on the right side. As shown in the enlarged view, the protrusion portion 5145 formed at the tip portion 5144 of the sample attachment part 5143 is fitted with the taper portion 310B for injection needle guide. Similarly, the protrusion portion 5146 formed at the tip portion 5144 of the sample attachment part 5143 is also fitted with the taper portion 310C for discharge needle guide.

In this manner, according to the protrusion portions 5145 and 5146 formed at the tip portion 5144, that are fitted with the taper portions 310B and 310C formed in the sample holder 310, respectively, in the state where the sample holder 310 is attached to the tip portion 5144 of the sample attachment part 5143 of the goniometer head 514, the position of the sample holder 310 with respect to the sample attachment part 5143 of the goniometer head 514 is automatically determined, and thus positioning the crystalline sponge 380 (that is, a sample soaked into a crystalline sponge) attached to the tip portion of the pin 3104 in the sample holder 310 is facilitated, when the sample is analyzed by the single-crystal X-ray structure analysis apparatus 500. Further, reproducibility of positioning the crystalline sponge 380 is improved.

Further, the very small protrusion portions 5145 and 5146 each are formed in a hemispherical shape, or a conical shape whose tip portion is rounded, and thus easy attachment thereto at an accurate position and in an accurate direction is facilitated by being guided with the taper portions 310B and 310C, even when the position is slightly displaced with respect to the taper portions 310B and 310C formed in the sample holder 310.

As described above, according to the present Example, the position (direction) of the sample holder 310 with respect to the goniometer head 514 is determined by fitting the very small protrusion portions 5145 and 5146 formed onto the goniometer head 514 with the taper portions 310B and 310C formed in the sample holder 310, when attaching the sample holder 310 with which the sample is soaked in the crystalline sponge 380 to the goniometer head 514 in the single-crystal X-ray structure analysis apparatus 500; and thus positioning the very small and fragile crystalline sponge 380 with respect to the X-ray tube 511 can be easily and surely carried out with good reproducibility. In addition, an example in which a plurality of the very small protrusion portions 5145 and 5146 are formed is explained herein, but the very small protrusion portion that is to be formed may be either one of the very small protrusion portions 5145 and 5146, if it is present at the position of being displaced from the center of the goniometer head 514.

Example 2

Figure 16:
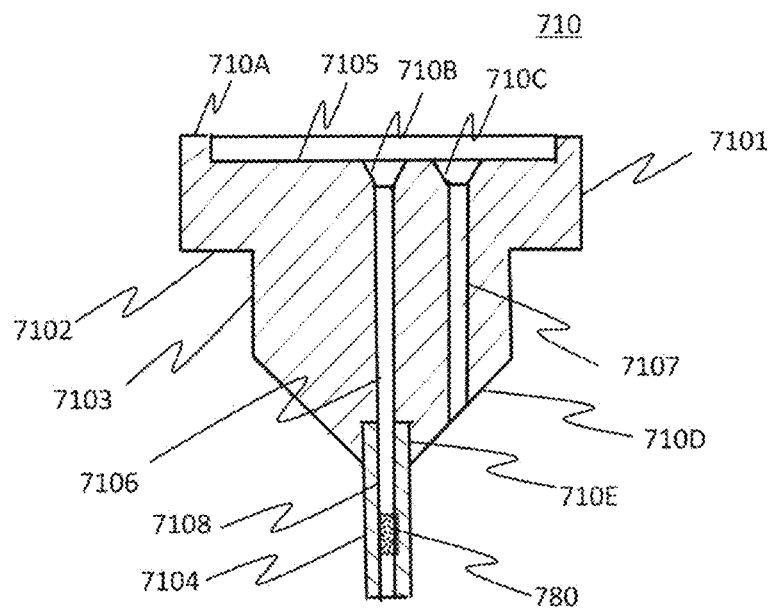
FIG. 16 is a sectional view showing a sample holder of a soaking machine relating to the second example according to the present invention.

The configuration in which the crystalline sponge 380 is attached to the tip portion of the pin 3104 of the sample holder 310 has been described in the first Example, but the case of using a sample holder 710 in the configuration as shown in FIG. 16 is described in the present Example.

According to the present Example, the configuration excluding the sample holder 710 is the same configuration as shown in FIG. 8 in EXAMPLE 1 and the configuration of the applicator 311 is also the same as shape of the applicator 311 that has been described using FIG. 12 and FIG. 13 in EXAMPLE 1, and thus those described in detail are omitted.

In the sample holder 710 used in the present Example, as showing its cross-sectional shape in FIG. 16, a pipe 7104 is newly attached and fixed to a recess portion 710E formed in the tip portion of a guide surface 710D processed into a taper shape, ahead of the trunk portion 7103 of the sample holder 710. A hole 7108 connected to an injection needle hole 7106, that is formed in the sample holder 710 is formed inside the pipe 7104. A crystalline sponge 780 in which a sample is soaked is formed (or attached) into the hole 7108 of the pipe 7104.

The sample holder 710 body is formed of magnetic metal, but this pipe 7104 formed of a material transmitting X-rays such as, for example, borosilicate glass, quartz, Kapton or the like is inserted in the recess portion 710E formed in the tip portion of the guide surface 710D, and is further fixed with an adhesive or the like.

A base portion 7101 of the sample holder 710, a lower surface 7102 of the base portion 7101, and a recess portion 7105 inside an upper surface 710A of the base portion 7101 each are the same as the configuration of corresponding portions to the sample holder 310 described in EXAMPLE 1, and thus those described in detail are omitted.

In the present Example, the injection needle 306 is inserted in the injection needle hole 7106, and the discharge needle 331 is inserted in the discharge needle hole 7107 by attaching the sample holder 710 in such a configuration into the applicator 311 described in EXAMPLE 1 referring to FIG. 12. A taper portion 710B is formed as a guide surface when inserting the injection needle 306, at an end portion on an upper side of the injection needle hole 7106.

The configuration in which a sample is supplied to a crystalline sponge 780 from the injection needle 306 inserted in the injection needle hole 7106, at an upper end portion of which the taper portion 710B is formed; and gas or liquid inside the applicator 311 is discharged by the discharge needle 331 is the same as the case in EXAMPLE 1, and those described therein are omitted.

In addition, according to the configuration shown in FIG. 16, a case where a hole 7108 formed into a pipe 7104 has the same diameter from top to bottom is shown, but in FIG. 16, the hole 7108 may have a taper shape in such a manner the diameter becomes larger toward the lower side, or may be formed into a stepped shape in such a manner that the diameter becomes larger in the middle than that on the upper side.

According to the present example, the sample can be more safely soaked into a very small and fragile crystalline sponge 780 attached into the injection needle hole 7108, that is formed by passing through the pipe 7104 at the center portion of the sample holder 710, in a state where the sample holder 710 is attached into the applicator 311.

Further, according to the present Example, similarly to the case in EXAMPLE 1, the control section 340 controls the supply side first actuator 302 and the supply side analysis section 303, and further the supply side second actuator 304; and the discharge side first actuator 333, the discharge side analysis section 334, the discharge side second actuator 335, and further the temperature controller 320 to soak a sample in the very small and fragile crystalline sponge 780; and thus it becomes easier to set the soaking condition of the sample than that in the case where the sample is soaked in the crystalline sponge by a conventional manual operation.

Furthermore, according to the present Example, similarly to the case in EXAMPLE 1, it can be easily confirmed with the control section 340 that the sample is surely soaked into the crystalline sponge 780, by comparing data obtained via analysis with the supply side analysis section 303 with data obtained via analysis with the discharge side analysis section 334.

Figure 17:
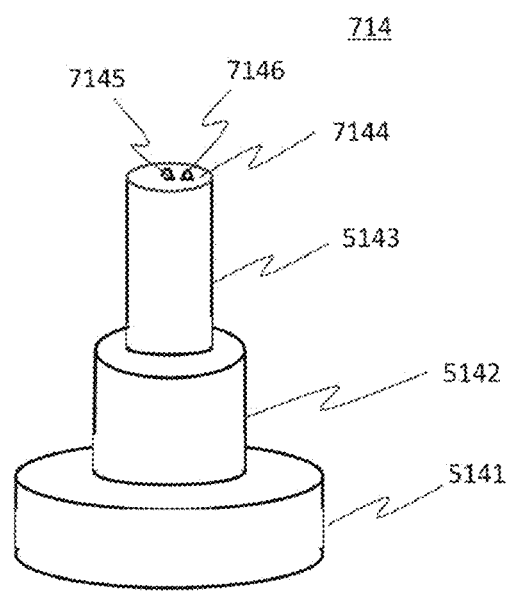
FIG. 17 is a perspective view showing a goniometer head of the single-crystal X-ray structure analysis apparatus, to which the sample holder relating to the above-described second Example is attached.

FIG. 17 shows an outline configuration of the appearance the goniometer head 714 to which the sample holder 710 is attached in the above-described second example. The number indicating the same constituent part as the goniometer head 514 shown in FIG. 14 is used as same. According to the sample holder 710 of the second example, those different from the goniometer head 514 in EXAMPLE 1 as shown in FIG. 14 are the protrusion portions 7145 and 7146 formed at the tip portion 7144 of the sample attachment part 5143.

The protrusion portion 7145 is formed at the position corresponding to the taper portion 710B in the sample holder 710, that is, in the central part of the tip portion 7144 of the goniometer head 714, when the sample holder 710 is attached to the goniometer head 714. On the other hand, the protrusion portion 7146 is formed at the position corresponding to the taper portion 710C of the sample holder 710, similarly to EXAMPLE 1.

In this example, though not shown in the figure herein, in the state where the sample holder 710 is attached to the tip portion 7144 of the sample attachment part 7143 of the goniometer head 714, the protrusion portion 7145 formed at the tip portion 7144 of the sample attachment part 7143 is fitted with the taper 710B for injection needle guide in the sample holder 710 while similarly to the above-described example, the protrusion portion 5146 formed at the tip portion 7144 of the sample attachment part 7143 is fitted with the taper 310C for discharge needle guide in the sample holder 710.

In this manner, in the state where the sample holder 710 is attached to the tip portion 7144 of the sample attachment part 7143 of the goniometer head 714, the position of the sample holder 710 with respect to the sample attachment part 7143 of the goniometer head 714 is determined by fitting the protrusion portions 7145 and 7146 formed at the tip portion 7144 with the taper portions 710B and 710C in the sample holder 710, respectively; and thus positioning the very small and fragile crystalline sponge 780 in which a sample is soaked is facilitated, the sample formed inside a hole 7108 of a pipe 7104 connected with the injection needle hole 7106 formed by passing through the central portion of the sample holder 710, when the sample is analyzed by the single-crystal X-ray structure analysis apparatus 500. Further, reproducibility of positioning the crystalline sponge 780 is improved.

In addition, examples in which a plurality of very small protrusion portions 7145 and 7146 are formed are explained herein, but according to very small protrusion portions that are to be formed, the very small protrusion portion 7145 corresponding to the center position of the goniometer head 514 is not always necessary, and only the protrusion portion 5146 being at the position dislocated from the center of the goniometer head 514 may be provided.

As described above, according to the present example, when the sample holder 710 with which a sample is soaked the very small and fragile crystalline sponge 780 is attached to the goniometer head 714 in the single-crystal X-ray structure analysis apparatus 500, the position (direction) of the sample holder 710 with respect to the goniometer head 714 is automatically determined by fitting the very small protrusion portions 7146 and 7147 formed onto the goniometer head 714 with the taper portions 710B and 710C formed in the sample holder 710, respectively. Thus, positioning the very small and fragile crystalline sponge 780 with respect to the X-ray tube 511 can be easily and surely performed with good reproducibility.

In addition, though various Examples according to the present invention are described above, the present invention is not limited to the above-described Examples and includes various modified examples. For example, the above-described Examples describe the entire system in detail in order to facilitate understanding of the present invention, but are not necessarily limited to those having all the configurations that have been described. Further, a part of a configuration of each Example may be replaced with a configuration of another Example; further, a configuration of another Example may also be added to a configuration of one Example; and with respect to a part of a configuration of each Example, further performed may be addition/deletion/replacement of another configuration.

The present invention is widely applicable for a searching method of a material structure, an X-ray structure analysis apparatus used for the same, and so forth.

In addition, the present international application claims priority under Japanese Patent Application No. 2018-219810, filed Nov. 23, 2018, and the entire content of Japanese Patent Application No. 2018-219810 is applied to the present international application.

EXPLANATION OF THE SYMBOLS

100 . . . Single-crystal X-ray structure analysis system; 200 . . . Chromatography apparatus; 300 . . . Soaking machine for single-crystal X-ray structure analysis apparatus; 302 . . . Supply side first actuator; 303 . . . Supply side analysis section; 304 . . . Supply side second actuator; 306 . . . Injection needle; 310, 710 . . . Sample holder; 311 . . . Applicator; 320 . . . Temperature controller; 333 . . . Discharge side first actuator; 334 . . . Discharge side analysis section; 335 . . . Discharge side second actuator; 340 . . . Control section; 5145, 5146, 7145, 7146 . . . Protrusion portion; 714 . . . Goniometer head; 3106, 7106 . . . Injection needle hole; 3107 . . . Discharge needle hole; and 310B, 310C, 710B, 710C . . . Taper portion.

The invention claimed is:

1. A single-crystal X-ray structure analysis apparatus that performs a structure analysis of a material, the single-crystal X-ray structure analysis apparatus comprising:
an X-ray source that generates X-rays;
a goniometer having a goniometer head to which a sample holder is attached, the sample holder holding a porous complex crystal where a sample is soaked;
an X-ray irradiation section that irradiates the X-rays to the porous complex crystal whose position is adjusted with the goniometer head;
an X-ray detection measurement section that detects and measures X-rays diffracted or scattered by the sample; and
a structure analysis section that performs a structure analysis of the sample based on the diffracted or scattered X-rays detected by the X-ray detection measurement section,
wherein a positioning portion for positioning the sample holder to be attached is formed on a surface of the goniometer head, the sample holder being attached;
the positioning portion comprises a fitting structure for being fitted with the sample holder;
the sample holder comprises a through-hole of which a surface has a taper portion formed to be attached to the goniometer head, and
the fitting structure has a size to be stored inside the taper portion.

2. A single-crystal X-ray structure analysis apparatus that performs a structure analysis of a material, the single-crystal X-ray structure analysis apparatus comprising:
an X-ray source that generates X-rays;
a goniometer having a goniometer head to which a sample holder is attached, the sample holder holding a porous complex crystal where a sample is soaked;
an X-ray irradiation section that irradiates the X-rays to the porous complex crystal whose position is adjusted with the goniometer head;
an X-ray detection measurement section that detects and measures X-rays diffracted or scattered by the sample; and
a structure analysis section that performs a structure analysis of the sample based on the diffracted or scattered X-rays detected by the X-ray detection measurement section,
wherein a positioning portion for positioning the sample holder to be attached is formed on a surface of the goniometer head, the sample holder being attached;
the positioning portion comprises a fitting structure for being fitted with the sample holder;
the fitting structure is formed on a portion of being displaced from the center of the tip surface of the goniometer head, where the sample holder is attached to.

3. The single-crystal X-ray structure analysis apparatus according to claim 1,
wherein the fitting structure is formed at a tip portion of the goniometer head.

4. The single-crystal X-ray structure analysis apparatus according to claim 2,
wherein the sample holder comprises a through-hole of which a surface has a taper portion formed to be attached to the goniometer head, and
the fitting structure has a size to be stored inside the taper portion.

5. The single-crystal X-ray structure analysis apparatus according to claim 1,
wherein the fitting structure has a hemispherical shape, or a conical shape whose tip portion is rounded.

6. The single-crystal X-ray structure analysis apparatus according to claim 2,
wherein the fitting structure has a hemispherical shape, or a conical shape whose tip portion is rounded.

7. The single-crystal X-ray structure analysis apparatus according to claim 1,
wherein the fitting structures are formed at a plurality of positions in a portion of the goniometer head, where the sample holder is attached to.

8. The single-crystal X-ray structure analysis apparatus according to claim 2,
wherein the fitting structures are formed at a plurality of positions in a portion of the goniometer head, where the sample holder is attached to.

9. A sample holder used in a single-crystal X-ray structure analysis apparatus, the sample holder comprising:
a base part attached to a goniometer head of a goniometer in the single-crystal X-ray structure analysis apparatus; and
a holding part that holds a porous complex crystal capable of soaking a sample in a plurality of fine pores formed therein, the holding part formed on the base part,
wherein the base part has a fitting structure formed for being fitted with the goniometer head;
the fitting structure comprises a taper portion;
the base part has a sample introduction structure formed to introduce the sample into the porous complex crystal; and
the taper portion is formed on a side attached to the goniometer head of the sample introduction structure.

10. A sample holder used in a single-crystal X-ray structure analysis apparatus, the sample holder comprising:

a base part attached to a goniometer head of a goniometer in the single-crystal X-ray structure analysis apparatus; and a holding part that holds a porous complex crystal capable of soaking a sample in a plurality of fine pores formed therein, the holding part formed on the base part, wherein the base part has a fitting structure formed for being fitted with the goniometer head;

the fitting structure is formed to fit with the goniometer head's fitting structure which is formed on a portion of being displaced from the center of the tip surface of the goniometer head, where the sample holder is attached to.

* * * * *